(12) United States Patent
Mason

(10) Patent No.: US 11,028,301 B2
(45) Date of Patent: Jun. 8, 2021

(54) TEMPERATURE REGULATING POLYURETHANE GELS

(71) Applicant: Technogel Italia S.r.L., Pozzoleone (IT)

(72) Inventor: Matteo Mason, Limena PD (IT)

(73) Assignee: TECHNOGEL ITALIA S.R.L., Pozzoleone (IT)

( * ) Notice: Subject to any disclaimer, the term of this patent is extended or adjusted under 35 U.S.C. 154(b) by 0 days.

(21) Appl. No.: 16/390,415

(22) Filed: Apr. 22, 2019

(65) Prior Publication Data

US 2019/0249058 A1 Aug. 15, 2019

Related U.S. Application Data

(63) Continuation of application No. 15/406,813, filed on Jan. 16, 2017, now Pat. No. 10,316,234.

(30) Foreign Application Priority Data

Jan. 25, 2016 (EP) ..................................... 16000169

(51) Int. Cl.
| | |
|---|---|
| *C08K 5/06* | (2006.01) |
| *C08G 18/10* | (2006.01) |
| *C08G 18/22* | (2006.01) |
| *C08G 18/48* | (2006.01) |
| *C08G 18/50* | (2006.01) |
| *C08G 18/76* | (2006.01) |
| *C08G 18/80* | (2006.01) |
| *C08K 5/101* | (2006.01) |
| *C09K 5/06* | (2006.01) |

(52) U.S. Cl.
CPC .............. *C09K 5/06* (2013.01); *C08G 18/10* (2013.01); *C08G 18/227* (2013.01); *C08G 18/4829* (2013.01); *C08G 18/4841* (2013.01); *C08G 18/7664* (2013.01); *C08G 18/8064* (2013.01); *C08K 5/101* (2013.01); *C08G 2220/00* (2013.01)

(58) Field of Classification Search
None
See application file for complete search history.

(56) References Cited

U.S. PATENT DOCUMENTS

| | | | | |
|---|---|---|---|---|
| 8,232,364 | B2 * | 7/2012 | Hoffman | C08G 18/227 528/59 |
| 8,535,572 | B2 * | 9/2013 | Tsonev | C08G 18/831 252/511 |
| 2012/0193572 | A1 * | 8/2012 | MacKay | B29C 44/3446 252/78.1 |
| 2013/0034683 | A1 * | 2/2013 | Kramer | B29C 45/14467 428/71 |
| 2013/0296449 | A1 * | 11/2013 | Peterson | C08J 9/0009 521/122 |

FOREIGN PATENT DOCUMENTS

JP 2006233176 A 9/2006

* cited by examiner

*Primary Examiner* — Tae H Yoon
(74) *Attorney, Agent, or Firm* — W & C IP

(57) ABSTRACT

A method for the production of a temperature regulating polyurethane gel composition and corresponding articles includes fatty acid esters as a phase change material (PCM) directly incorporated in the fluid phase of a polyurethane gel without encapsulation. The liquid or melted PCM is solved in the polyol component of the gel and is able to crystallize and melt within the gel structure reversibly. The polyurethane gels are under-crosslinked and include an at least nominal three functional ethylene oxide-comprising alkylene oxide polyether polyol with 0 to 40% EO and an isocyanate with an effective functionality of from 1.5 to 3.5. The gels are useful in articles where the gel can be positioned close to the human body for temperature regulating purposes, and especially to improve the sleeping comfort of a resting person.

12 Claims, 3 Drawing Sheets

TEMPERATURE REGULATING POLYURETHANE GELS

CROSS-REFERENCE TO RELATED APPLICATIONS

This application is a continuation of application Ser. No. 15/406,813, filed on Jan. 16, 2017, now U.S. Pat. No. 10,316,234, which claims priority to European Patent Application No. 16000169.9, filed on Jan. 25, 2016, the contents of which are hereby incorporated by references in their entirety.

FIELD OF THE INVENTION

The invention relates to a method for the production of a temperature regulating polyurethane gel composition comprising a phase change material (PCM), which is directly incorporated in the dispersing phase of a polyurethane gel without encapsulation, the temperature regulating polyurethane gel obtained with said method and articles in connection therewith comprising said polyurethane gel, where the gel is used to achieve a temperature regulating behaviour, preferably in close to body applications and applications directed to sleeping comfort.

BACKGROUND

Polyurethane Gels are often used for pressure distributing purposes, for example in mattresses, anti-fatigue mats, saddles, pressure distributing pads, etc.

A gel is defined here in accordance with IUPAC terminology as a "non-fluid polymer network that is expanded throughout its whole volume by a fluid", a so-called swelling agent or extender. The fluid (discontinuous phase, dispersing phase, dispersant or fluid phase) may be physically or chemically bound within the network (network phase, continuous phase) which can be physically or chemically cross-linked. In a polyurethane gel (PU-gel), the crosslinked polyurethane backbone constitutes the continuous phase. The intrinsic physical properties of the gel allow it to support the user with an increased contact surface. Since the material is able to move in any direction without irreversible flow and distribute the weight avoiding discomfort and pressure marks.

EP 57838 (Burgdorfer et al.), EP 511570 (Schapel et al.), and U.S. Pat. No. 4,404,296 (Schapel) disclose polyurethane gels developed for the purposes outlined above. In these gels the polyurethane forming polyol functions not only as a reactant but also as a liquid dispersing agent or "expanding fluid" and thus constitutes the fluid phase of the polyurethane gel that is expanding the polyurethane network.

EP 2 789 270 A1 (Losio et al.), WO 2013/076661 A1 (Mason), and US 2013/0000045 A1 (Losio) disclose padding products and support elements, including mattresses with an upper gel structure providing a resting surface with high user comfort due to favourable cushioning and adaptability properties.

In addition to cushioning and optimal pressure distribution perfectly provided by the above-mentioned polyurethane gels, a satisfactory heat management is desired as well since polyurethane gels might suggest a cooling or heating effect to the user. Moreover, polyurethane and other polymer gels per se do not allow for air circulation. After only a short time, heat flow from the body ceases, e.g. in a shoe, an orthopaedic device or in other more or less closed environments. The user might then feel uncomfortable and sweat.

An attempt to solve this problem is disclosed in US 2003/0088019 A1 (Pause et al.), in which polyurethane gel materials comprise finely divided Phase Change Materials (PCM)

The introduction of materials which absorb and store large quantities of heat from the surroundings during a phase change into matrices that do not change the physical state in the same temperature range, leads to a climatizing or temperature buffering effect. Mechanical and other properties of the product should be determined by the matrix while the temperature control is driven by PCM properties. However, there may be drawbacks such as limited PCM uptake in the matrix, change or loss of important matrix properties and loss of PCM by exudation during the product lifespan. In the latter case encapsulation of the PCM may be necessary to prevent leakage from the matrix. The effects caused by phase change materials entrapped in matrices are currently used in a wide variety of applications—inter alia in functional textiles, orthopaedic and sports equipment such as skiing boots, cushioning and insoles, as well as bedding products and building materials, e.g. wall or floor panels.

In general, a phase transition from the solid to the liquid state occurs on reaching the melting temperature during a heating process. During this melting process, the PCM absorbs and stores considerable latent heat. At least 160 J/g are desirable for a pronounced effect in a polymer matrix. The temperature of the PCM remains virtually constant during the entire process. During a subsequent cooling process, the stored heat is released again from the PCM to the surroundings while the reverse phase transition from the liquid to the solid state, the crystallisation, takes place. Again the temperature of the PCM remains constant during this process and there is a climate and temperature controlling effect regarding the overall device or product which is equipped with the PCM The temperature range of the phase change is adjusted for each application as required, for example at room temperature, at body temperature, at a certain climate control temperature, desired cooling temperature, etc. In most cases, the melting point needed for an application is targeted with the help of PCM mixtures.

Although a broad range of PCM mixtures is commercially available and all these materials have been studied in detail, the properties of PCM mixtures in polymer matrices are still unforeseeable. Some phase transitions tend to be irreversible or not fully reversible over a sufficient number of cycles.

For most PCM there may be a gap between the melting temperature $T_m$ and the crystallisation temperature $T_c$ which is highly undesired. This phenomenon is referred to as supercooling or undercooling. It occurs when a liquid is cooled below its melting point without becoming solid. In the worst case, the supercooling effect can deteriorate the desired temperature compensation and regulation.

Hydrocarbons and fats are an important group of phase change materials. They are most commonly used because of their low cost and low toxicity.

Paraffins have proved to be especially useful for an easy targeting of phase change ranges. Paraffin mixtures meet any PCM temperature specification from about 0-300° C. with poor or no supercooling effect. This seems to be due to very homologous molecular properties, esp. with respect to mixtures US 2003/0088019 A1 (Pause et al.) discloses to incorporate saturated hydrocarbons or fats as PCM in a shock absorbing or cushioning material made of a polyurethane gel. This improves comfort when using the gel material in items such as shoe soles, bicycle seats, chair cushions, mattresses, etc. The paraffins are embedded directly into the PU matrix without encapsulation since encapsulation seriously slows down and deteriorates the heat transfer. Moreover, encapsulation is expensive and the capsules can break down in the soft PU-gel from wear. According to the concept described in US 2003/0088019 A1 the non-polar PCM is thoroughly emulsified in the more polar polyurethane mass, preferably within a polar polyol component, and entrapped in very finely dispersed droplets within the matrix. Unfortunately, paraffins and fats tend to leak from polyurethanes, produce a fatty or oily surface, and thus shorten the lifetime of the PCM-equipped product. Moreover, the tack may be lost, an important property for certain applications. Exudation of entrapped materials from PU gels is to be expected since U.S. Pat. No. 4,404,296 (Schapel) discloses the use of those gels as active-ingredient release compositions.

Another important group of commercially available solid-liquid phase change materials comprise fatty acids and fatty acid esters. The latter are available for phase change ranges between ca. −50° C. and about +100° C. and can be readily mixed in any ratio to target the desired phase change behaviour needed for an application. Nevertheless, fatty acids and fatty acid esters are not as compatible between each other as paraffins and tend to show miscibility gaps and a tendency to supercool. Thus, in most cases it is unforeseeable whether a fatty acid ester PCM will work within a specific polymer matrix or not, and whether the material will show substantial, small or no supercooling effects. Different matrix polymers may give rise to different supercooling behaviours for the same PCM. On the other hand, even homologous PCM can show very different behaviours in the same matrix polymer.

US 2011/0281485 A1 (Rolland et al.) discloses a composition comprising or produced from a blend of at least one fatty acid ester (PCM) and at least one ethylene copolymer, wherein the ethylene copolymer comprises a considerable amount of a polar co-monomer, preferably a vinyl acetate or an acrylic component. The focus lies on the development of a blend of a suitable copolymer composition with conventional, e.g. fatty acid phase change materials. The tendency to supercool could be reduced with increasing vinyl acetate content. Since the matrix polymer has to be adapted to the PCM, the material suffers from restrictions to tune other desired properties, e.g. mechanical properties.

OBJECTS OF THE INVENTION

It is therefore an object of the invention to find improved heat management solutions applicable in polyurethane gels and to overcome the problems encountered in the state of the art. It is another object to provide temperature regulating gel materials for a wide range of application temperatures. It is yet another object to find a gel material equalling the basic gel in appeal and touch that is stable for a long lifespan of the product with a multitude of temperature change cycles without exudation of PCM.

Optimal heat management is especially desired to facilitate recreative sleep for a person resting in contact with the gel. Temperature balancing heat management is capable to improve sleep comfort considerably.

Thus, a further object of this invention is to provide a polyurethane gel composition showing temperature regulating or climatizing properties with respect to the environment. The material should also be able to absorb heat from the body of a person in contact with the gel and release heat to the body depending on the body's actual heat production, especially during sleep.

It was the inventor's aim to incorporate a PCM within a PU-matrix without having negative effects on haptic and mechanical properties of the basic gel material.

SUMMARY

The present invention teaches a method for the production of a temperature regulating polyurethane gel composition comprising a phase change material (PCM) which is selected for the targeting of a temperature range where heat exchange with the surroundings takes place and which is directly incorporated in the dispersing phase or "fluid phase" of a polyurethane gel without encapsulation.

DETAILED DESCRIPTION

Figure 1:
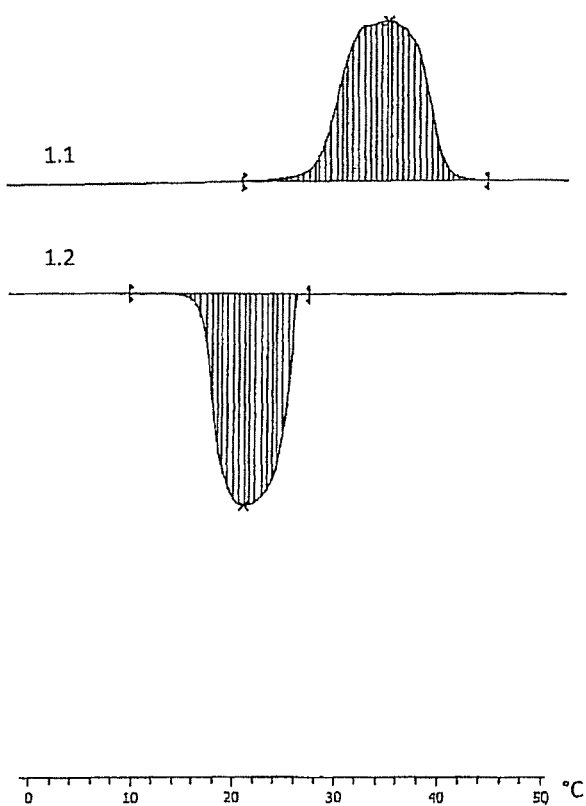
FIG. 1 is a graph of a DSC heating and cooling cycle performed with lauryl laurate (C12C12)

An aspect of the invention pertains to a method comprising at least the following steps:

Step 1:

Selecting and providing a polyol component and an isocyanate component for the production of a polyurethane gel, wherein the fluid expanding the gel network is provided by the polyol component.

The polyol is the sole dispersant or gel fluid phase material. There is no other extender in any substantial amount, for instance no water like in a hydrogel.

The polyol component selected for the gel according to the invention comprises at least one at least (nominally) three-functional ethylene oxide-comprising alkylene oxide polyether polyol with 0 to 40 wt.-% ethylene oxide (EO).

Suitable polyol compounds are liquid at room temperature or slightly above room temperature and are known to those skilled in the art.

The nominal functionality of the polyols according to this invention is at least three. This means that there are—factual or as a mean value—at least three hydroxyl groups present per polyol molecule, preferably from three to eight hydroxyl groups per molecule. Such polyethers may be produced by the addition of epoxides, and preferably ethylene oxide and propylene oxide, either in a mixture or successively to starting components with reactive hydrogen atoms. The effective functionality of a polyether polyol of this type is approximately from 2.8 to close to 3.0, i.a. depending on the extent of side reactions during synthesis.

Suitable starting components having reactive hydrogen atoms include at least three functional (trihydric) alcohols, ammonia and amines, trihydric or higher hydric alcohols are much preferred. Suitable starter molecules are glycerol, di- and oligomers of glycerol, trimethylolpropane, hexane-1,2,6-triol, butane-1,2,4-triol, trimethylolethane, pentaerythritol, dipentaerythritol and oligomers of pentaerythritol, mannitol, sorbitol, methylglycoside, other sugar-derived polyols. Multifunctional polyols according to the invention, produced via alkoxide chain growth reactions are branched molecules with linear polyether branches and terminal OH-groups, preferably with EO-OH tips. Suitable polyether polyols are described, for example, in DE 1176358 for sucrose based polyethers, in DE 2639083 for formose started polyester polyols, and in EP 1 926 768 for pentaerithritol started, glycerol started and other oligomer started polyether polyols.

It is part of the inventive concept to achieve an "under crosslinking" with an excess of OH-groups. Chains, i.e. "branches" with free functional OH-groups provide the fluid phase or dispersant of the gel. In other words, part of the polyol forms the fluid gel phase, in which the selected PCM (method step 2, see below) has been solved (method step 3, see below) and thereby incorporated (method step 4, see below). The number of functional groups within the initial gel mixture can be described as $OH_{total} > NCO_{total}$.

Under the conditions of under crosslinking an excellent solvent environment is created within the PU-gel to solve the fatty acid ester PCM. The EO content and the concept of "free" not-crosslinked polyether polyol branches as taught here are the key parameters for the solvation of the fatty acid ester PCMs.

Surprisingly, the PCM is able to crystallize and re-solve repeatedly at temperatures close to those in pure substance (see DSC-profiles under TESTS below, FIGS. 1 and 2). It is amazing and could not be expected that a PCM is able to keep its functionality under these conditions, that is without a separate PCM-phase like in a capsule or in an emulsion.

The isocyanate component selected for the gel according to the invention comprises at least one isocyanate with a reactive ("effective") functionality from 1.5 to 3.5, preferably from 1.8 to 2.9. It is preferred to select an organic diisocyanate and/or polyisocyanate. Suitable isocyanates in accordance with this invention are represented by the formula $Q(NCO)_n$, in which n is 2 to 4, providing the NCO-functionality as recited above and Q is an aliphatic hydrocarbon radical containing 2 to 18 and preferably 6 to 10 carbon atoms, a cycloaliphatic hydrocarbon radical containing 4 to 15 and preferably 5 to 10 carbon atoms, an aromatic hydrocarbon radical containing 6 to 15 and preferably 6 to 13 carbon atoms or an araliphatic hydrocarbon radical containing 8 to 15 and preferably 8 to 13 carbon atoms. Suitable and preferred polyisocyanates are disclosed for instance in U.S. Pat. No. 5,362,834 and the references cited therein with respect to polyisocyanates, and in U.S. Pat. No. 8,232,364 with respect to NCO-prepolymers The skilled practitioner is able to produce polyurethane gels according to the common techniques known in polyurethane chemistry. The specific polyurethane gels wherein part of the polyol forms the dispersant or "fluid phase" of the resulting gel—that is, wherein the polyurethane forming polyol component itself provides the fluid gel phase expanding the network—are described in detail in U.S. Pat. No. 4,404,296, EP 057 838, and EP 511 570, all of which are incorporated herein by reference, in particular with respect to practical aspects of polyurethane gel production.

As usual, the gel forming reaction may be carried out in the presence of appropriate catalysts, fillers and/or additives as known in the art and described in the aforementioned state of the art documents.

The "polyol component" may comprise one or more catalyst, fillers and/or additives, like commonly used in polyurethane formulations and within the practitioners skills, in addition to the selected one or more polyol. Accordingly, the "isocyanate component" may comprise one or more catalysts, fillers and/or additives in addition to the selected one or more isocyanate.

Step 2:

Providing a liquid or melted PCM for an intended temperature regulation range, wherein the PCM is selected from the group consisting of fatty acid esters and mixtures thereof.

Fatty acid esters and mixtures of fatty acid esters are commercially available as phase change materials for a broad range of application temperatures. They are miscible in every ratio and thus it is possible to target different temperatures and temperature ranges. The fatty acid esters are available from natural renewable sources and at moderate costs. Material shortages are not to be expected. Fatty acid ester PCMs have been widely tested, they are environmentally acceptable, that is non-toxic and uncritical for humans and environment.

The amount of the PCM or PCM mixture in the PU gel composition should not exceed 60 wt.-% (percent by weight), preferably the PCM is present with up to 40 wt.-%, more preferred with up to 30 wt.-%.

Preferably, the fatty acid esters used here and solved in the polyol in step 3 as discussed below are free of OH-groups and other Zerewitinoff-active hydrogen on the chain, in order not to take part in the polyurethane reaction.

The fatty acid esters (FAE) are—in accordance with the common chemical definitions—monoesters of C6-C26 aliphatic carboxylic acids, that is linear saturated or unsaturated long chain acids. The ester residue is preferably an alkyl or fatty alcohol residue, for example methyl, ethyl, propyl, isopropyl, butyl, isobutyl, pentyl and higher alkyls, namely fatty alcohol residues.

Both saturated and unsaturated fatty acid esters are suited for the purposes of this invention. Mixtures are used to target the desired phase change temperatures and intervals.

The following fatty acid esters are preferred:

aliphatic esters of the C(6:0) to C(26:0) acids, i.e., with saturated C-chains from 6 to 26 carbon atoms, preferably aliphatic esters of the C(8:0) to (C(20:0) acids, preferably with ester residues as cited above, aliphatic esters of the C(6:1) to C(26:1) acids, i.e., with one C—C-double bond in the chain, preferably with ester residues as cited above, and mixtures between all these above cited esters.

Preferred examples of these esters are:

the stearyl esters C(18:0)-C(x:0), with x from 1 to 16, exemplified but not restricted to C(18:0)-C(1) MES, methyl stearate; C(18:0)-C(2) EES, ethyl stearate, C(18:0)-C(6:0) hexyl stearate, as well as stearates with higher fatty alcohol residues; C(18:1)-C(1) MEO, methyl oleate; C(18:1)-C(2) EEO, ethyl oleate, C(18:1)-C(6:0) hexyl oleate, as well as oleates with higher fatty alcohol residues; C(16:0)-C(1) MEP, methyl palmitate, C(16:0)-C(2) EEP, ethyl palmitate, C(16:0)-C(6:0) hexyl palmitate, C(16:0)-C(12:0) dodecyl palmitate and others, especially with higher fatty alcohol residues; C(14:0)-C(1) methyl myristate, C(14:0)-C(2) ethyl myristate, as well as myristates with higher fatty alcohol residues, as exemplified but not limited to C(14:0)-C(14:0) myristyl myristate;

C(12:0)-C(1) methyl laurate, C(12:0)-C(2) ethyl laurate, as well as laurates with higher fatty alcohol residues, as exemplified but not limited to C(12:0)-C(12:0) lauryl laurate;

Mixtures of at least two esters can be selected to optimize phase change materials with respect to target temperatures or temperature intervals, respectively. The practitioner can find the best PCM for a specific application by means of a variation of chain length and mixing ratio. This can be done in easy tests.

It is preferred to mix saturated FAEs with saturated FAEs for close to body applications, where the temperature interval between room temperature (25° C.) and body temperature (37° C.) has to be targeted. It is further preferred to mix unsaturated FAEs with unsaturated FAEs or shorter chain saturated FAEs to target cooling and other heat management applications.

Step 3:

Mixing the polyol component and the PCM both in the liquid state to obtain a single phase with full miscibility between the components, without phase separation. A full miscibility without phase separation according to this invention is achieved, when a clear solution is obtained and no phase separation is observed at a temperature above the melting point of the PCM. For a solution of PCM in polyol no phase separation is observed, even after standing for 24 hours at a temperature above the melting point, which can be used as a test for complete miscibility of PCM and polyol. As long as the solution is maintained above the melting point or range of the fatty acid ester PCM, the solution is clear, i.e. crystal transparent and not "cloudy". This seems to indicate the complete solvation of the PCM, i.e. the fatty acid esters. Thus, the PCM is not only entrapped in the reacted gel composition, e.g. in small droplets of an own phase, but fully incorporated.

The inventors found that it is essential to use an alkylene oxide polyether polyol without EO or with a lower EO-content from 0 up to about 40 wt.-% of ethylene oxide (EO), preferably from 0 to 25%, and more preferably from 10 to about 21%, in order to achieve full miscibility of the fatty acid ester PCM and the polyol (EO % are always percent by weight of 100% polyether polyol). Since the fatty acid ester PCM may be solid at room step has then to be performed at elevated temperatures to bring and keep the mixing temperature the mixing partners in the liquid state. A clear single phase system is produced from the polyol(s) and the PCM prior to the step of reacting the components to produce the gel.

The specification of the alkylene oxide polyether polyol influences the ability of the polyol to solvate the fatty acid ester PCM. The practitioners will be able to find out whether a specific fatty acid ester or mixture selected as a PCM will be fully miscible with a selected polyol in very simple experimental tests. Miscibility will certainly be given, if the EO content of the alkylene oxide polyether polyol is below 40%, more certainly if the content is not higher than about 25% and most certainly if the content is not higher that about 21%. This seems to be especially true for polyols with middle to long chain length as characterized by their molecular weight. To find a system with full miscibility more easily, it is therefore proposed to use polyols with molecular weights above 1900, preferably above 2000. Examples how to find full miscibility of polyol and PCM are given in the test section at the end of this description where tables of miscibility are shown to exemplify these findings (tables 1-4).

It seems to be important to keep the temperature of the polyol-PCM-mixture above the crystallization temperature of the PCM until the polyurethane components have been mixed and the mixture is allowed to gel. Of course it is possible to prepare the mixture of polyol and PCM earlier and to store and may be transport the mixture without keeping it above the PCM crystallization temperature all the time. It is then important to heat the mixture and re-solve the PCM in the polyol prior to further processing. If the PCM separates from the polyol even in the liquid or melted state, the PCM-polyol-combination is not suited for use according to this invention.

Step 4:

Reacting the polyol component-PCM-mixture and the isocyanate component to form the temperature regulating polyurethane gel composition.

The further processing of the polyol component comprising the PCM on the one hand and the isocyanate component on the other hand is accomplished with conventional equipment as known in the art. The individual components or mixtures of components may be transported, metered and mixed by the units known per se in polyurethane chemistry.

The polyurethane gel obtained by the inventive method is long-term stable without exudation of any PCM. It can be used for many heating-cooling-cycles which are fully reversible. Tests showing this favourable behaviour are given in the experimental part at the end of this description.

It is most remarkable that the fatty acid esters are able to crystallize and melt within the gel with phase change temperatures close to those of the pure PCM, although the PCM is not only entrapped in the gel but somehow bound by secondary binding forces preventing the exudation of PCM. Unexpectedly it is an advantage to solve the PCM in the polyol and the resulting gel instead of emulsifying or dispersing it. The basic gel specified according to the invention allows for the excellent temperature regulating properties of the PCM containing gel.

As shown in some tests, in most cases the melting temperatures and crystallization temperatures of e.g. 20 wt.-% FAE within the gel according to the invention are very close to the melting and crystallization points of the same FAE in substance. This could not be expected. Usually, the phase transition properties are strongly influenced in multi component systems and considerable supercooling effects have to be coped with.

We are now taking reference to the preferred embodiments of this invention.

In preferred embodiments the one or more alkylene oxide polyether polyol with 0 to 40% EO is present in the polyol component in an amount of at least 60 wt.-%, more preferred in an amount of at least 90 wt.-%. Other polyols may be present in lower amounts. The presence of other polyols is not preferred, however.

It is further preferred, that except ethylene oxide there is a considerable amount of an alkylene oxide producing secondary OH-groups on the chain, preferably propylene oxide. Thus, in preferred embodiments, the alkylene oxide polyether polyol is a propylene oxide/ethylene oxide (PO/EO)-polyether polyol.

It is further preferred to make use of polyols with a molecular weight above 1900, more preferably above 2000 (number average).

It is further preferred that the isocyanate index of the gel components is from 20 to 75, more preferred from 20 to 60.

It is a further unexpected advantage that the method according to the invention can be executed on a standard high-pressure injection moulding machine.

The gel composition according to the invention is preferably moulded by injection moulding or other moulding techniques to gel in a mould and form a three-dimensional product or article or to produce a thin sheet material or foil.

In preferred embodiments the mould is lined with a layer, preferably a polymer film, forming a cover layer of the moulded gel product. The film may be treated with a primer. The cover layer may be a polyurethane film, a silicone film or another appropriate film, a textile covering or for example an impregnated textile overlay.

The new temperature regulating polyurethane gel composition according to this invention is the gel obtainable with the method as described above in detail. If the basic gel is tacky, this is in general conserved in the PCM-containing gel composition. Other properties of the basic gel, for instance mechanical properties such as elasticity, elongation at break, and the pressure distribution behaviour are merely unchanged as well.

Due to the broad range of fatty acid esters and mixtures of fatty acid esters available, the target temperatures are wide spread and can be tuned with respect to the desired application. It is possible to create smaller or broader melting ranges and smaller or broader crystallization or freezing ranges. Target temperatures range from minus degrees Celsius for cooling applications to up to about 100° C. if appropriate.

In preferred embodiments the phase change temperature or range, that is both the melting point or range and the crystallisation point or range, lie between from −20° C. to +50° C. This includes gels suitable for cooling applications in the private household or in industry, as well as heat exchange damping applications in the building industry.

If there is a melting range and a crystallization range, respectively, rather than a melting point or crystallization point, we refer to the "melting temperature" as the temperature where most if not all of the PCM is in the molten, liquid state as visually determined by a change from turbid to clear in the appearance of a non-filled reference gel material. Accordingly, we refer to the "crystallization temperature" as the temperature where most if not all of the PCM is in the solid, crystallized state, which is determined in the same manner.

A focus of this application lies on close to body applications. For these specific purposes the gel or an article made thereof is adapted for the temperature regulation of a human body resting in contact to the polyurethane gel composition which is able to absorb heat from the body and release heat to the body depending on its heat production or demand/need. For these purposes, and especially for all the purposes in connection with improvements of sleeping comfort, the targeted range lies between 22° C. and 40° C., more preferably between 22° C. and 38° C., and most preferably between 26° C. and 38° C. This means that the phase change temperature lies between said temperatures what is at least true when both the melting point or range—or the "melting temperature" as defined above—and the crystallisation point or range—or the "crystallization temperature" as defined above—lie within the specified temperature values.

Articles with the new thermoregulating polyurethane gel comprise for example orthopaedic and sports equipment, such as pads patches, pouches, compresses, bandages and braces, cushioning and insoles, bicycle seats; bedding products, such as mattresses, mattress covers, pillows, cushions; products for living comfort such as upholstery, seats, backrests and armrests, loungers, body supports of any kind; cooling and tempering equipment such as bags, containers, jackets; products for the building industry such as wall and floor panels; electronic casings; laminated and coated textiles.

In the articles the gel composition can be combined with at least one other material, preferably selected from the group consisting of foam materials, thermoplastic materials, duromeric materials, elastomeric materials and thermoplastic elastomers, which are preferably polyurethane based, as well as textiles, natural upholstering material, paper, cardboard, wood, metal and glass. The additional materials and the gel could also form a composite material, for example with a layered structure or with gel pads enclosed in or supported by a structure of one or more other materials.

According to certain embodiments, the gel composition or the article in the whole can be covered by a cover layer, or covered partially by a cover layer on the gel side, or enclosed in a casing, wherein the cover or casing is preferably made of a polymer foil, a textile or a web. For many applications an impregnated textile or a waterproof textile are preferred.

In other embodiments there is more than one polyurethane gel composition incorporated, wherein the compositions differ in the amounts of PCM and/or the phase change temperatures provided by the distinct PCM-compositions.

The preferred articles according to the invention which are designed for close to body applications are adapted for temperature regulation of a human body resting in contact to the polyurethane gel which is able to absorb heat from the body and release heat to the body depending on its heat production or demand, wherein the phase change temperature, that is both the melting temperature and the crystallisation temperature (as defined above), lie between from 22° C. to 38° C., preferably for applications directed to sleeping comfort. "Resting in contact with the polyurethane gel" refers to a "close contact" as well. This means that it is not excluded to cover the gel part of the article with a thin cover layer, as far as the cover layer does not considerably impedes or torpedoes the heat transfer between gel and human body or other body the temperature of which has to be regulated with a PCM incorporated into a polyurethane gel according to the invention.

An example of an article in the form of a mattress, a comparable body support or a mattress topper where the polyurethane gel composition according to this invention can be incorporated in combination with other materials is given in EP 2 692 265 B1 the disclosure of which is incorporated herein by the way of reference.

Finally, the invention also encompasses the use of the temperature regulating gel composition or of the article, both as described above, to absorb heat from the surrounding and release heat to the surrounding with the selected target temperatures and phase change temperatures.

Miscibility Tests

One of the most relevant findings of this invention is that the full miscibility of the liquid fatty acid ester PCM and the liquid polyol leads in the end to long-term stable, non-exuding gel articles. As far as this condition is met, The fatty acid ester PCM is able to reversibly crystallize and re-solve within the dispersing phase of the gel provided by part of the polyol component. Moreover, the phase change temperatures in the gel do not depart too much of what can be expected for the specific fatty acid ester(s) which are employed. The polyol-PCM-mixtures with complete miscibility according to the invention are crystal transparent above the PCM phase change temperature and cloudy below.

The inventors educed criteria to select useful polyols as reactants for the gels according to the invention. The annexed miscibility tables 1 to 4 illustrate the dependencies.

The different miscibility of fatty acid ester PCM depending on the nature of the polyether polyols, i.e., the amount of ethylene oxide per molecule and the chain length, is notable. The tables 1 to 4 show the characteristics of selected polyols and show the properties of a fatty acid ester example (lauryl laurate) as PCM in the polyol and in the gel. When no solution of PCM in polyol can be obtained, the PCM will leak from the gel product. No satisfactory gel products are obtained in that cases. The quality of the solution depends on the polyol characteristics, as indicated in the tables.

Melting Temperatures/Melting Point Ranges

The melting points of the following binary FAE mixtures are given to show the targeting of phase change temperatures:

| binary mixture | mp ° C. (100:0-0:100 in wt.- %) |
|---|---|
| MEP/MES | 29-38 |
| MEP/EES | 29-33 |
| MEP/EEP | 29-23 |
| MES/EES | 38-33 |
| EEP/MES | 23-38 |
| EEP/EES | 23-33 |
| MEO/MEP | (−36)-29 |
| MEO/MES | (−36)-38 |

EXAMPLES

Samples were prepared by mixing a polyole blend (a mixture of a polyol, PCM and Catalyst, see BLEND) and an isocyanate as indicated below and reacting the same under conventional polyurethane gel preparation conditions on commercially available machines. A PUR high-pressure mixing and dosing machine was employed to produce gel test blocks. The starting temperature of the material was 55° C., the pressure was 180 bar. The test blocks were used to determine mechanical and other properties (see TESTS).

There are four groups of Examples (I to IV) where 100 parts by weight of a polyol component (in the form of a blend) are mixed with varying amounts of isocyanate to exemplify the effect of different isocyanate-indices and shore (000)-values. The data for the four experimental series is listed in the corresponding tables "Example I, II, III and IV"

Materials

Poly 1: a polyether polyol prepared by the propoxylation of sorbitol and subsequent ethoxylation of the alkoxylation product, having an OH number of 28.5, molecular weight of 11800 (number average) and a functionality of 6;

Poly 2: a polyether polyol prepared by the propoxylation of glycerol and subsequent ethoxylation of the alkoxylation product, having an OH number of 28.0, molecular weight of 6010 and a functionality of 3;

PCM 1: lauryl laurate ($C_{(12:0)}$-$C_{(12:0)}$), $C_{24}H_{48}O_2$ (~99%), MP 29° C.;

PCM 2: miristyl miristate ($C_{(14:0)}$-$C_{(14:0)}$), $C_{28}H_{56}O_2$ (~99%), MP 38° C.;

Isocyanate 1: a first NCO-prepolymer according to U.S. Pat. No. 8,232,364, comprising the reaction product of Desmodur® 44V10 (a polymethylene polyphenyl isocyanate commercially available from Bayer Material Science AG; having an NCO group content of 31.5%, a mean NCO functionality of 2.4, and a viscosity at 25° C. of 100 mPa·s) with a polyoxyalkylendiol monoalkyl ether having a number average molecular weight of 1700 g/mol and functionality of 1 rendering a theoretical NCO group content of 3.0%;

Isocyanate 2: a second NCO-prepolymer according to U.S. Pat. No. 8,232,364 comprising the reaction product of Desmodur® 44V20 (a polymethylene polyphenylisocyanate commercially available from Bayer Material Science AG; having an NCO group content of 31.5%, a mean NCO functionality of 2.8, and a viscosity at 25° C. of 200 mPa·s) with a polyoxyalkylendiol monoalkyl ether; having a number average molecular weight of 1700 g/mol and functionality of 1, rendering a theoretical NCO group content of 8.7%;

Isocyanate 3: Desmodur® 44V20, a polymethylene polyphenylisocyanate commercially available from Bayer MaterialScience AG; having an NCO group content of 31.5%, a mean NCO functionality of 2.8, and a viscosity at 25° C. of 200 mPa·s;

Isocyanate 4: a NCO-prepolymer according to U.S. Pat. No. 6,191,216 with HDI (hexamethylene diisocyanate) and polypropylene oxide, having an average molecular weight of 400, OH 280, in a 7:1 NCO/OH-ratio to yield a theoretical NCO group content of 12.6 and a functionality of 2, viscosity 2500;

Catalyst: Coscat® 83 available from Vertellus Specialties Inc. U.S.

BLEND 1: Poly 1+PCM1+PCM2 in the weight ratio as indicated in the tables in parts by weight (b.w.) plus 0.3 percent by weight of the Catalyst (Coscat® 83);

BLEND 2: Poly 2+PCM1+PCM2 in the weight ratio as indicated in the tables in parts by weight (b.w.) plus 0.3 percent by weight of the Catalyst (Coscat® 83);

100 parts by weight of the respective blend was mixed and reacted with the indicated amount of the isocyanate (given in the tables in parts by weight (pbw))

Example I

| No. | Poly 1 (pbw) | PCM 1 (pbw) | PCM 2 (pbw) | Isocyanate 1 (pbw) | Index | surface | Shore-000 (20° C.) | Remarks |
|---|---|---|---|---|---|---|---|---|
| 1 | 83.4 | 8.3 | 8.3 | 20.8 | 35.0 | (liquid) | — | no gel |
| 2 | 83.4 | 8.3 | 8.3 | 25.0 | 42.1 | adhesive | 0.0 | |
| 3 | 83.4 | 8.3 | 8.3 | 33.0 | 55.6 | adhesive | 31 | |
| 4 | 83.4 | 8.3 | 8.3 | 37.5 | 63.2 | adhesive | 41 | |
| 5 | 83.4 | 8.3 | 8.3 | 41.7 | 70.3 | not adhesive | 50 | *) |
| 6 | 83.4 | 8.3 | 8.3 | 50.0 | 84.3 | not adhesive | 63 | *) |
| 7 | 83.4 | 8.3 | 8.3 | 59.8 | 100 | not adhesive | 68 | *) |
| 8 | 77 | 11.5 | 11.5 | 23.0 | 42 | adhesive | 11 | |
| 9 | 72 | 14 | 14 | 21.4 | 41.8 | adhesive | 10 | |

*) Migration of PCM to the surface

Example II (very soft gels)

| No. | Poly 1 (pbw) | PCM 1 (pbw) | PCM 2 (pbw) | Isocyanate 2 (pbw) | Index | surface | Shore-000 (20° C.) |
|---|---|---|---|---|---|---|---|
| 10 | 83.4 | 8.3 | 8.3 | 4.0 | 19.6 | (liquid) | — |
| 11 | 83.4 | 8.3 | 8.3 | 4.5 | 22.0 | adhesive | 0.0 |
| 12 | 83.4 | 8.3 | 8.3 | 5.0 | 24.5 | adhesive | 21.1 |

Example III (gels according to Schapel (U.S. Pat. No. 4,404,296); Index 15-62, product f*f>5.2)

| No. | Poly 1 (pbw) | PCM 1 (pbw) | PCM 2 (pbw) | Isocyanate 3 (pbw) | Index | surface | Shore-000 (20° C.) | Remarks |
|---|---|---|---|---|---|---|---|---|
| 13 | 83.4 | 8.3 | 8.3 | 1.3 | 23.0 | (liquid) | — | |
| 14 | 83.4 | 8.3 | 8.3 | 1.4 | 24.8 | adhesive | 0.0 | |
| 15 | 83.4 | 8.3 | 8.3 | 1.6 | 28.3 | adhesive | 15.7 | |
| 16 | 83.4 | 8.3 | 8.3 | 2.0 | 35.4 | adhesive | 43.8 | |
| 17 | 83.4 | 8.3 | 8.3 | 4 | 70.8 | not adhesive | 83.7 | *) |
| 18 | 77 | 11.5 | 11.5 | 1.4 | 26.8 | adhesive | 22.6 | |
| 19 | 72 | 14 | 14 | 1.3 | 26.6 | adhesive | 24.8 | |

*) Migration of PCM to the surface

Example IV

| No. | Poly 2 (pbw) | PCM 1 (pbw) | PCM 2 (pbw) | Isocyanate 4 (pbw) | Index | surface | Shore-000 (20° C.) | Remarks |
|---|---|---|---|---|---|---|---|---|
| 20 | 83.4 | 8.3 | 8.3 | 7.9 | 57 | (liquid) | — | |
| 21 | 83.4 | 8.3 | 8.3 | 9.1 | 66 | adhesive | 40 | |
| 22 | 83.4 | 8.3 | 8.3 | 10 | 72 | adhesive | 52 | |
| 23 | 83.4 | 8.3 | 8.3 | 12.5 | 90 | not adhesive | 78 | *) |
| 24 | 83.4 | 8.3 | 8.3 | 14.2 | 100 | not adhesive | 81 | *) |

*) Migration of PCM to the surface

Tests on the Examples

Test 1: melting point ranges of FAE mixtures and as PCM in gels

| PCM (ratio in parts by weight) | Mp. of PCM (° C.) | $\Delta H_{tot}$ [J/g] of PCM | Mp. 20% PCM in PU-gel (Poly 1 + NCO 1 (Ex.))** |
|---|---|---|---|
| Octadecane (reference) | 28 | 244 | 28 |
| MEP | 29 | 199 | 29 |
| MES | 38 | 208 | 38 |
| MES/EEP (20/80) | 21 | 217 | less |
| MES/MEO (40/60) | 27 | 188 | 27 |
| MEP/MES (20/80) | 29 | 213 | 29 |
| MEP/EEP (80/20) | 25 | 175 | less |

**)visually determined in the gel (change from turbid to clear)

The gels had been prepared according to the description in the Examples above. There was no difference observed for the preparation on a LP-machine or a HP-machine (55° C.-180 bar; 70° C. 195 bar). LP-machine is a mixing machine that use a mechanical mixer to join the two components; polyol blend and Isocyanate, HP-machine is a mixing machine that join the two components by nebulization of them through injectors. It could not be expected that the melting points of the PCM kept almost unchanged for the material within the gel according to the invention compared to the melting points in substance. This is an advantage that makes it much easier to find PCMs for desired target temperatures.

Test 2: Migration test

Tests have been performed to preclude migration of the PCM to the gel surface under stress since pads, upholstery, mattresses, pillows and other pressure distributing elements have to stand certain pressure conditions. Compression tests were performed with sandwich samples between metal plates. The order of layers was: paper foil, PU film, paper foil, foam, polyurethane gel, PU film, paper foil. Samples were compressed at 50% of their total height and put in an oven at 70° C. for three weeks. A visual examination did not reveal wet paper foils. The surface of the test specimen was visually examined afterwards and was even and unchanged. There was no fluid entrapped under the skin.

Test 3: Differential Scanning calorimetry (DSC) is a thermoanalytical technique in which the difference in the amount of heat required to increase the temperature of a sample and reference is measured as a function of temperature—see description in connection with FIGS. 1 and 2

Test 4: Climate Chamber Tests on Pillows—see description in connection with FIG. 3.

Figure 2:
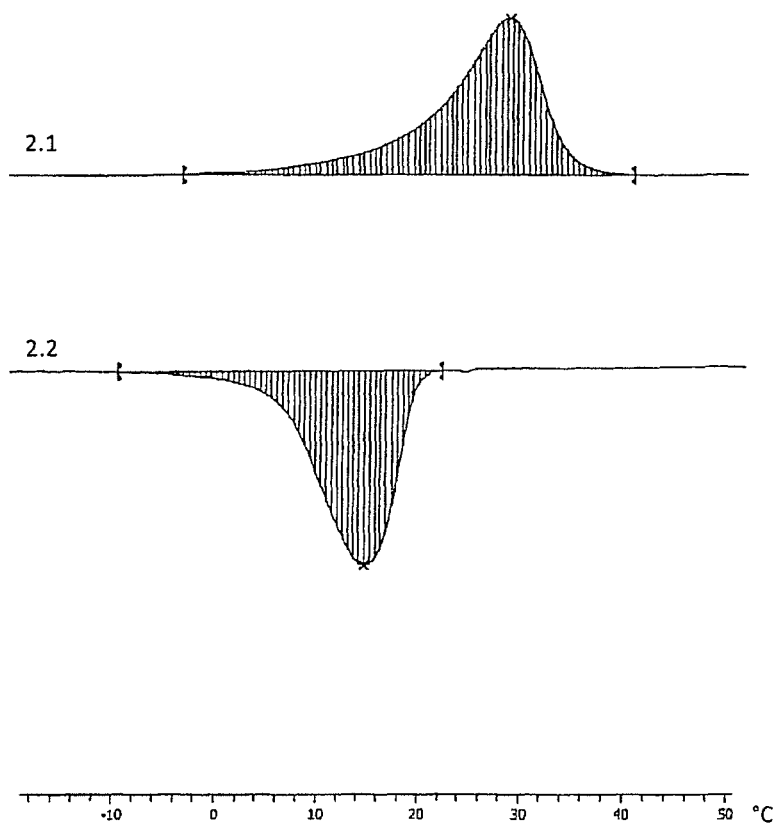
FIG. 2 is a graph of a DSC heating and cooling cycle performed with a blend of lauryl laurate in a gel according to Example 1 (Poly 1/Iso 1)

With reference to the drawings, FIGS. 1 and 2 are diagrams of differential scanning calorimetry (DSC) experiments carried out on a pure PCM in FIG. 1 and on a gel body according to the invention in FIG. 2.

Captions:

FIG. 1 Heating-cooling-cycle on lauryl laurate (C12;0 C12;0)

DSC Tg in Helium 1.1. (Second) Heating Period of the Material:

| | |
|---|---|
| Integral | 3558.44 mJ |
| normalized/standardized | 230.62 J/g |
| Onset | 27.62° C. |
| Peak | 32.38° C. |
| heating rate | 20.00° C./min |

1.2. Cooling Period:

| | |
|---|---|
| Integral | −3659.06 mJ |
| normalized/standardized | −237.14 J/g |
| Onset | 26.44° C. |
| Peak | 24.24° C. |
| heating rate | −20.00° C./min |

FIG. 2 Heating-cooling cycle on lauryl laurate, 13.5% by weight in "standard polyurethane gel" according to Example (Poly1/Isocyanate1) DSC Tg in Helium 2.1. (Second) Heating Period of the Gel Specimen:

| | |
|---|---|
| Integral | 715.55 mJ |
| normalized/standardized | 29.99 J/g |
| Onset | 18.70° C. |
| Peak | 28.11° C. |
| heating rate | 20.00° C./min |

2.2. Cooling Period:

| | |
|---|---|
| Integral | −713.78 mJ |
| normalized/standardized | −29.92 J/g |
| Onset | 20.02° C. |
| Peak | 15.39° C. |
| heating rate | − 20.00° C./min |

The diagrams are self-explanatory. Heating and cooling profiles appear within the same, overlapping temperature ranges. This allows to make use of the gel material according to this invention for temperature regulation purposes and to use the fatty acid ester PCMs and mixtures within the very gels as specified and described above in great detail. A complete exchange of melting heat with the surroundings takes place, even when the PCM is incorporated in a polyurethane gel as taught by the inventors.

Figure 3:
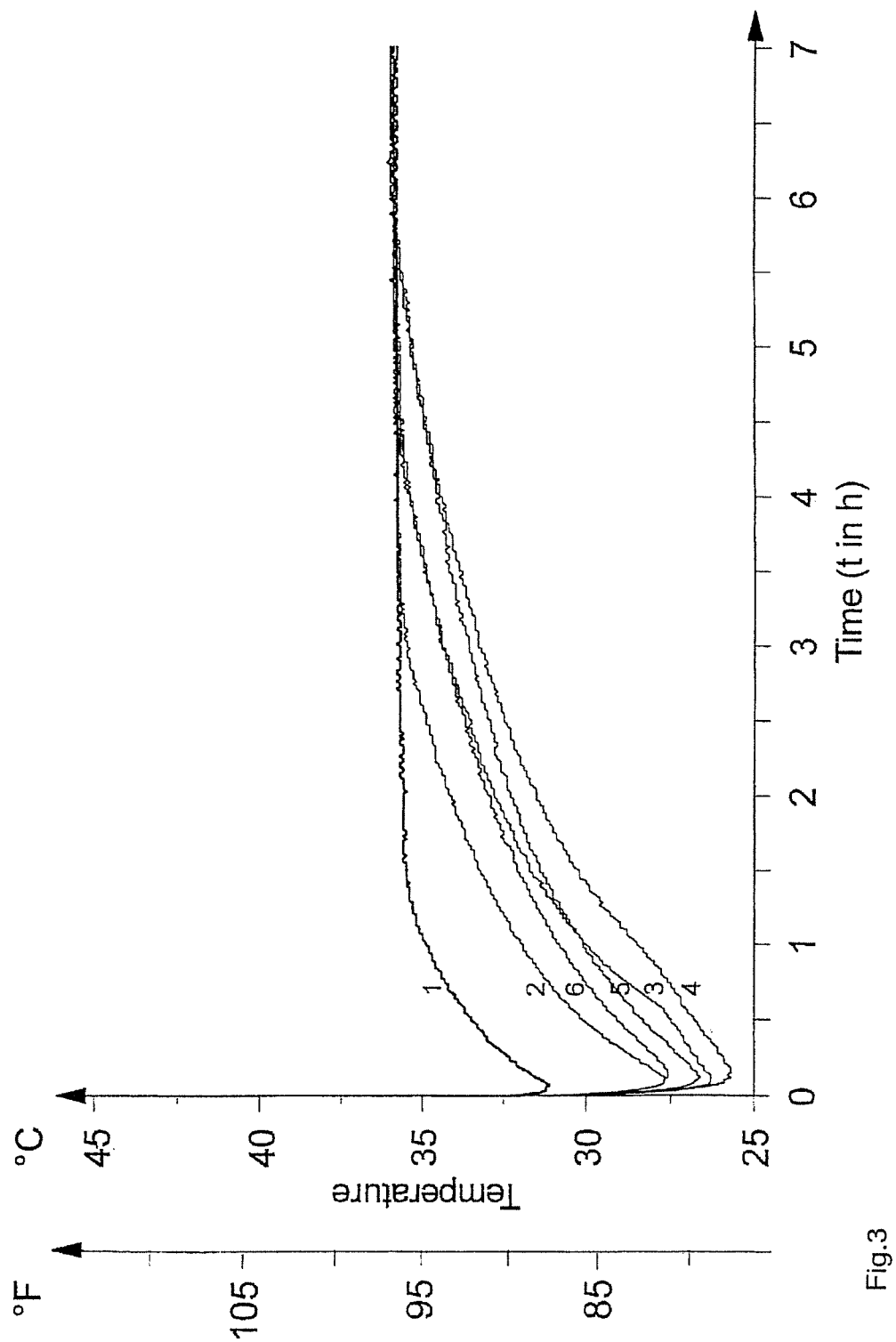
FIG. 3 are temperature profiles for microclimatic tests with pillows.

FIG. 3 shows the graphical results of equilibration experiments with pillows in a climate chamber.

The tests shown have been performed by "Ergonomie Institute München, Germany" with a surrounding temperature of 35° C. in a climate chamber. The temperatures on the gel surface were measured in dependence of time as explained in connection with the DSC experiments.

Caption of FIG. 3

1. classical pillow made of foam and PU gel (standard, not according to invention) sensor on the foam side—reference;
2. same as line 1, sensor on the gel side, gel layer comprising 1 kg gel;
3. shape of the pillow as before, gel layer (1 kg gel) comprising 13.5 wt. % of microencapsulated paraffin C8 (octane, mp. 28° C.)
4. shape of the pillow as before, gel layer (1 kg gel) comprising 13.5 wt.-% lauryl laurate (mp 29° C.)
5. shape of the pillow as before, gel layer (1 kg gel) comprising 13.5 wt.-% lauryl laurate and stearyl stearate 50/50 (mp. 29-38° C.)
6. shape of the pillow as before, gel layer: 1.7 kg standard gel (see 2. for the gel)

A thermoregulatory simulation model was used to analyse the microclimatic properties (temperature on the surface) of the pillow under the following conditions:

Test room air conditions: 21° C., 50% rel. humidity, air movement <0.05 m/s;

Conditioning: All elements in the test set-up as well as the test pillow are conditioned for 24 hours at the test room air conditions prior to conducting the experiments;

Duration of experiments: 7 hours. If the measuring parameter temperature has not reached a steady-state after 7 test hours, the duration of the experiment is extended in each case by two hours until a steady-state has been achieved.

According to the diagram, however, all the pillows reached the steady state within 7 hours. Final temperatures after 7 hours: 35.8-36.0° C.;

Repeat tests: 5 tests were conducted under the same test conditions. If the deviation was more than 0.3 K, the experiments were then repeated until the deviation between the two sequential tests amounts to ≤0.3 K.

The experiments were done with "classical pillows", in the shape 40×80 cm, thickness 8 cm, and with a gel layer positioned on one side of the foam pillow. The gel layer was made of 1.0 kg gel in the tests according to 1.-5. and of 1.7 kg gel in test 6.

The diagram shows the excellent temperature control for the specimen according to the invention (4. and 5.) compared to standard gel pillows ((1. Foam side=foam pillow)), 2., 6.). The diagram shows the improvement that could be achieved in comparison to micro-encapsulated PCMs (see 3. and rapid temperature rise after satisfactory starting period). These beneficial properties keep available for a long period of time, i.e. of use of the product. No exudation of PCM or other deterioration in consequence of normal use could be detected.

TABLE 1

Long Chain Polyether Polyols

| Polyol | EO [%] | PO [%] | MW [g/mol] | fct.[3] | OH number [mg KOH/g] | Miscibility[1] of the polyol with 20 wt.-% Lauryl Laurate (FAE, mp 29° C.) | Leaking: Exsudation of fatty ester-PCM lauryl laurate showing on the gel product[2]? | Miscibility[1] of the polyol with 20 wt.-% Octadecane (paraffin, mp 28° C.) | Leaking: Exsudation of paraffin-PCM octadecane showing on the gel product[2]? |
|---|---|---|---|---|---|---|---|---|---|
| 1 | 0 | 97 | 3000 long chain | 3 | 56 | YES | NO | NO | YES |
| 2 | 15 | 84 | 6250 long chain | 3 | 27 | Yes | NO | NO | YES |
| 3 | 17 | 81 | 11800 long chain | 6 | 29 | YES | NO | NO | YES |
| 4 | 21 | 77 | 6235 long chain | 3 | 27 | YES | NO | NO | YES |
| 5 | 77 | 17 | 3350 long chain | 6 | 104 | NO | YES | NO | YES |
| 6 | 71 | 26 | 4500 long chain | 3 | 37 | NO | YES | NO | YES |
| 7 | 47 | 49 | 1700 long chain | 2 | 57 | NO | YES | NO | YES |

[1]miscibility: YES = complete miscibility (100%), single phase, crystal clear/transparent liquid after 24 h of standing above mp. (without use of emulsifier)
[2]for all miscibility tests: gel product prepared from commercially available EO/PO polyether polyols and isocyanate "20RE45", BAYER ®
[3]"fct.": nominal functionality of polyol

TABLE 2

Short Chain Polyether Polyols

| Polyol | EO [%] | PO [%] | MW [g/mol] | fct[3]. | OH number [mg KOH/g] | Miscibility[1] of the polyol with 20 wt.-% Lauryl Laurate (FAE, mp 29° C.) | Leaking: Exsudation of fatty ester-PCM lauryl laurate showing on the gel product[2]? | Miscibility[1] of the polyol with 20 wt.-% Octadecane (paraffin, mp 28° C.) | Leaking: Exsudation of paraffin-PCM octadecane showing on the gel product[2]? |
|---|---|---|---|---|---|---|---|---|---|
| 8 | 0 | 87 | 725 short chain | 3 | 231 | No | YES | No | YES |
| 9 | 18 | 72 | 1900 short chain | 6 | 175 | No | YES | No | YES |

[1]miscibility: YES = complete miscibility (100%), single phase, crystal clear/transparent liquid after 24 h of standing above mp. (without use of emulsifier)
[2]for all miscibility tests: gel product prepared from commercially available EO/PO polyether polyols and isocyanate "20RE45", BAYER ®
[3]"fct.": nominal functionality of polyol

TABLE 3

Mixed Long and Short Chain Polyether Polyols

| Polyols long chain/short chain (MG 11800/ MG 1900) | Mix Ratio (parts by weight) | EO [%] | PO [%] | MW [g/mol] | fct.[3] | OH number [mg KOH/g] | Miscibility[1] of the polyol with 20 wt.-% Lauryl Laurate (FAE, mp 29° C.) | Leaking: Exsudation of fatty ester-PCM lauryl laurate showing on the gel product[2]? |
|---|---|---|---|---|---|---|---|---|
| sample 1 | 90/10 | 18 | 80 | 10810 | 6 | 43.5 | YES | NO |
| sample 2 | 80/20 | 18 | 79 | 9800 | 6 | 57.8 | YES | NO |
| sample 3 | 70/30 | 18 | 78 | 8830 | 6 | 72.4 | YES | NO |
| sample 4 | 60/40 | 18 | 77 | 7840 | 6 | 87.1 | YES | NO |
| sample 5 | 50/50 | 18 | 76 | 6850 | 6 | 101.7 | NO | YES |

[1]miscibility: YES = complete miscibility (100%), single phase, crystal clear/transparent liquid after 24 h of standing above mp. (without use of emulsifier)
[2]for all miscibility tests: gel product prepared from commercially available EO/PO polyether polyols and isocyanate "20RE45", BAYER ®
[3]"fct.": nominal functionality of polyol

TABLE 4

Mixed Long Chain Polyether Polyols with HighEO-content (71% EO) and Low EO-Content (15% EO)

| Polyol | Mixing Ratio (parts by weight) low EO/high EO | EO [%] | PO [%] | MW [g/mol] | fct.[3] | OH number [mg KOH/g] | Miscibility[1] of the polyol with 20 wt.-% Lauryl Laurate (FAE, mp 29° C.) | Leaking: Exsudation of fatty ester-PCM lauryl laurate showing on the gel product[2]? |
|---|---|---|---|---|---|---|---|---|
| polyol 15/ polyol 71 | 90/10 | 20.7 | 77.9 | 6075 | 3 | 28.9 | NO | YES |
| polyol 15/ polyol 71 | 80/20 | 26.3 | 72.16 | 5900 | 3 | 29.8 | NO | YES |

[1]miscibility: YES = complete miscibility (100%), single phase, crystal clear/transparent liquid after 24 h of standing above mp. (without use of emulsifier)
[2]for all miscibility tests: gel product prepared from commercially available EO/PO polyether polyols and isocyanate "20RE45", BAYER ®
[3]"fct.": nominal functionality of polyol

The invention claimed is:

1. A temperature regulating polyurethane gel composition, comprising a non-exuding phase change material (PCM), selected from the group consisting of fatty acid esters and mixtures thereof, directly incorporated within a polyol dispersing phase of a polyurethane gel composition, wherein the temperature regulating polyurethane gel composition has a phase change temperature, that is both the melting temperature and the crystallisation temperature, that ranges from −20° C. to +50° C. and wherein a fluid expanding a gel network is provided by the polyol component which comprises one or more long chain polyether polyols,
   wherein the isocyanate component comprises one or more isocyanates with a reactive functionality from 1.5 to 3.5,
   wherein the PCM is directly incorporated into a fluid phase of the polyurethane gel without encapsulation,
   wherein the one or more long chain polyether polyols is an alkylene oxide polyether polyol produced by the addition of alkylene epoxide to a starting component comprising reactive hydrogen, selected from the group consisting of a propylene oxide polyether polyol with a number average molecular weight above 1900 and a propylene oxide/ethylene oxide polyether polyol with up to 25 wt. % of ethylene oxide (EO) and with a number average molecular weight above 1900,
   wherein the PCM is selected from the group consisting of fatty acid monoesters and mixtures thereof,
   wherein a single phase polyol component PCM mixture with complete miscibility between the polyol component and the PCM without phase separation.

2. The temperature regulating polyurethane gel composition according to claim 1, wherein the phase change temperature ranges from 22° C. to 38° C.

3. An article comprising at least one temperature regulating polyurethane gel composition of claim 1.

4. The article of claim 3 further comprising a cover layer or casing which respectively covers or encases the temperature regulating polyurethane gel composition.

5. The article of claim 4 wherein the cover layer or casing is made of a material selected from the group consisting of a polymer foil, a textile, and a web.

6. The article of claim 3 wherein the temperature regulating polyurethane gel composition is either cast to form a layer, shaped by moulding, or sprayed on a support.

7. The article of claim 6 further comprising a textile wherein the temperature regulating polyurethane gel composition is associated with the textile.

8. The article according to claim 3, wherein the temperature regulating gel composition is combined with at least one other material selected from the group consisting of foam materials, thermoplastic materials, duromeric materials, elastomeric materials, thermoplastic elastomers, textiles, natural upholstering material, paper, cardboard, wood, metal, and glass, to form a composite article.

9. The article according claim 3 wherein the article is configured as an item selected from the group consisting of a body support, a mat, a bedding product, a pillow, a cushion, a mattress, an orthopaedic article, a pad or padding, a compress, a pouch, a seat, at least a portion of a bicycle seat, a backrest, an armrest, a container, a bag, a jacket; a building element, an electronic casing, a laminated textile, and a coated textile.

10. The article according to claim 3 wherein the at least one temperature regulating polyurethane gel composition includes at least two different temperature regulating polyurethane gel compositions which differ in amounts of PCM and/or phase change temperatures.

11. The article according to claim 3, configured for temperature regulation of a human body resting in contact with or adjacent to the at least one temperature regulating polyurethane gel composition, wherein the at least one temperature regulating polyurethane gel composition is able to absorb heat from the human body and release heat to the human body depending on the human body's heat production or demand, wherein the at least one temperature regulating polyurethane gel composition has a phase change temperature, that is both a melting temperature and a crystallisation temperature, which ranges from 22° C. to 38° C.

12. A temperature regulating polyurethane gel composition made by reacting a mixture made of a polyol component and a phase change material (PCM), which is selected for an intended temperature regulation range, with an isocyanate component to form the temperature regulating polyurethane gel composition, wherein a fluid expanding a gel network is provided by the polyol component which comprises one or more long chain polyether polyols, wherein the isocyanate component comprises one or more isocyanates with a reactive functionality from 1.5 to 3.5, wherein the PCM is directly incorporated into a fluid phase of the polyurethane gel without encapsulation, wherein the one or more long chain polyether polyols is an alkylene oxide polyether polyol produced by the addition of alkylene epoxide to a starting component comprising reactive hydrogen, selected from the group consisting of a propylene oxide polyether polyol with a number average molecular weight above 1900 and a propylene oxide/ethylene oxide polyether polyol with up to 25 wt. % of ethylene oxide (EO) and with an average molecular weight above 1900, wherein the PCM is selected from the group consisting of fatty acid monoesters and mixtures thereof, and wherein the polyol component and the PCM are mixed while the polyol component and the PCM are both in a liquid state to obtain a single phase polyol component PCM mixture with complete miscibility between the polyol component and the PCM without phase separation.

* * * * *